(12) United States Patent
Liao et al.

(10) Patent No.: US 11,591,039 B2
(45) Date of Patent: Feb. 28, 2023

(54) BICYCLE HEAD AND BICYCLE SHIFT CONTROL BOX

(71) Applicant: TEKTRO TECHNOLOGY CORPORATION, Changhua County (TW)

(72) Inventors: Bo-Yi Liao, Changhua County (TW); Chia-Hao Yang, Changhua County (TW); Ting Hao Hsu, Changhua County (TW)

(73) Assignee: TEKTRO TECHNOLOGY CORPORATION, Changhua County (TW)

(*) Notice: Subject to any disclaimer, the term of this patent is extended or adjusted under 35 U.S.C. 154(b) by 0 days.

(21) Appl. No.: 17/468,640

(22) Filed: Sep. 7, 2021

(65) Prior Publication Data
US 2022/0081059 A1 Mar. 17, 2022

(30) Foreign Application Priority Data
Sep. 16, 2020 (TW) .................................. 109131925

(51) Int. Cl.
*B62K 23/02* (2006.01)
*B62K 21/12* (2006.01)
(Continued)

(52) U.S. Cl.
CPC ................. *B62K 23/02* (2013.01); *B62J 6/01* (2020.02); *B62J 45/20* (2020.02); *B62K 21/12* (2013.01); *B62L 3/02* (2013.01)

(58) Field of Classification Search
CPC ........ B62K 23/02; B62K 21/12; B62K 23/06; G05G 1/04; B62J 6/24; B62J 43/30; B62L 3/026; B62M 25/08
See application file for complete search history.

(56) References Cited

U.S. PATENT DOCUMENTS

| 7,760,078 B2 * | 7/2010 | Miki .................... B62K 23/02 340/432 |
| 2013/0098959 A1 * | 4/2013 | Onogi .................. B62J 50/225 224/419 |

(Continued)

FOREIGN PATENT DOCUMENTS

| CN | 103221698 A | * | 7/2013 | ............. B62K 19/32 |
| TW | 208630783 U | * | 3/2019 | ................ B62L 3/00 |

OTHER PUBLICATIONS

Machine translation of CN 103221698 A, Blandin et al., Jul. 24, 2013 (Year: 2013).*

*Primary Examiner* — Vinh Luong
(74) *Attorney, Agent, or Firm* — Maschoff Brennan

(57) ABSTRACT

A bicycle head is configured to be mounted on a bicycle frame. The bicycle head includes a vertical tube, a stem, a handlebar, a first brake lever, and a shift control box. One end of the stem is mounted on the vertical tube. The handlebar is fixed to another end of the stem. The first brake lever assembly is mounted on the handlebar. The first brake lever assembly includes a main body, a brake assembly, a shift switch, and a battery. The brake assembly and the battery are disposed on the main body, and the shift switch is disposed on the brake assembly. The shift control box is disposed on one of the vertical tube, the stem, and the handlebar and electrically connected to the battery and the shift switch.

18 Claims, 12 Drawing Sheets

(51) Int. Cl.
    *B62L 3/02*     (2006.01)
    *B62J 6/01*     (2020.01)
    *B62J 45/20*    (2020.01)

(56)           References Cited

U.S. PATENT DOCUMENTS

2017/0305395 A1*  10/2017  Komatsu .................. B62L 3/023
2019/0061855 A1*   2/2019  Ebrahemi .............. B62K 19/40
2019/0084640 A1*   3/2019  Eguchi ................... B62K 21/12
2019/0185109 A1*   6/2019  Howell-McLean .... B62K 23/02
2019/0248439 A1*   8/2019  Wang ...................... B62K 11/10
2019/0270494 A1*   9/2019  Liao ....................... B62M 25/08
2019/0300118 A1*  10/2019  Nishino ................. B62M 25/08
2019/0315436 A1*  10/2019  Wu ........................ B62M 25/08
2019/0367131 A1*  12/2019  Marangon ............. B62K 23/02
2019/0382074 A1*  12/2019  Bierwerth ............. B62K 23/02
2020/0354010 A1*  11/2020  Hsieh .................... B62K 21/12

* cited by examiner

BICYCLE HEAD AND BICYCLE SHIFT CONTROL BOX

CROSS-REFERENCE TO RELATED APPLICATIONS

This non-provisional application claims priority under 35 U.S.C. § 119(a) on Patent Application No(s). 109131925 filed in Taiwan, R.O.C. on Sep. 16, 2020, the entire contents of which are hereby incorporated by reference.

TECHNICAL FIELD

The disclosure relates to a bicycle head and a bicycle shift control box.

BACKGROUND

In recent years, road bikes, mountain bikes and other types of bicycles are all popular in the market, and it motivates bicycle manufacturers to pay more attention on improving their products.

A bicycle can equip an electronic shifting system using an electrical signal to drive a derailleur of the bicycle. In general, there is a shift switch disposed on a brake lever assembly of the bicycle, and the shift switch is electrically connected to a control box disposed on the bicycle head. When the shift switch is activated, the shift signal is produced and transmitted to the control box, then the control box transmits the shift signal to the derailleur for shifting the derailleur. A battery is required to provide electricity for the control box to transmit the shift signal, and the battery is commonly disposed inside the control box. However, the size of the control box is difficult to be reduced due to the arrangement of the battery inside the control box, causing the control box to adversely affecting the appearance of the bicycle. Also, the control box of larger size may interfere with the operation of the handlebar. Therefore, how to reduce the size of the control box is one of the crucial topics in this field.

SUMMARY OF THE INVENTION

The disclosure provides a bicycle shift control box with a reduced volume and a bicycle head having the same.

One embodiment of the disclosure provides a bicycle head. The bicycle head is configured to be mounted on a bicycle frame. The bicycle head includes a vertical tube, a stem, a handlebar, a first brake lever, and a shift control box. One end of the stem is mounted on the vertical tube. The handlebar is fixed to another end of the stem. The first brake lever assembly is mounted on the handlebar. The first brake lever assembly includes a main body, a brake assembly, a shift switch, and a battery. The brake assembly and the battery are disposed on the main body, and the shift switch is disposed on the brake assembly. The shift control box is disposed on one of the vertical tube, the stem, and the handlebar and electrically connected to the battery and the shift switch.

Another embodiment of the disclosure provides a bicycle shift control box. The bicycle shift control box includes a casing, a circuit board, at least one electrical connector. The circuit board is disposed in the casing. The circuit board has a control unit, a motion sensing unit, and a wireless transmission unit. The electrical connector is disposed on the circuit board. The electrical connector and one of the control unit, the motion sensing unit, and the wireless transmission unit are respectively located at two opposite surfaces of the circuit board.

Still another embodiment of the disclosure provides a bicycle shift control box. The bicycle shift control box includes a casing, a circuit board, and two electrical connectors. The circuit board is disposed in the casing. The electrical connectors are disposed on the circuit board. Each of the two electrical connectors includes at least one power port and at least one signal port spaced apart from each other.

According to the bicycle head and the bicycle shift control boxes as discussed in the above embodiments, the battery is electrically connected to the shift control box and is disposed in the main body of the first brake lever assembly; that is, the battery for the shift control box is not accommodated in the shift control box. Thus, the size of the shift control box has no need to consider the battery. As such, the shift control box may be lightweight and small as possible and therefore does not affect the appearance of the bicycle it applied and will not interfere with the operation of the handlebar.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
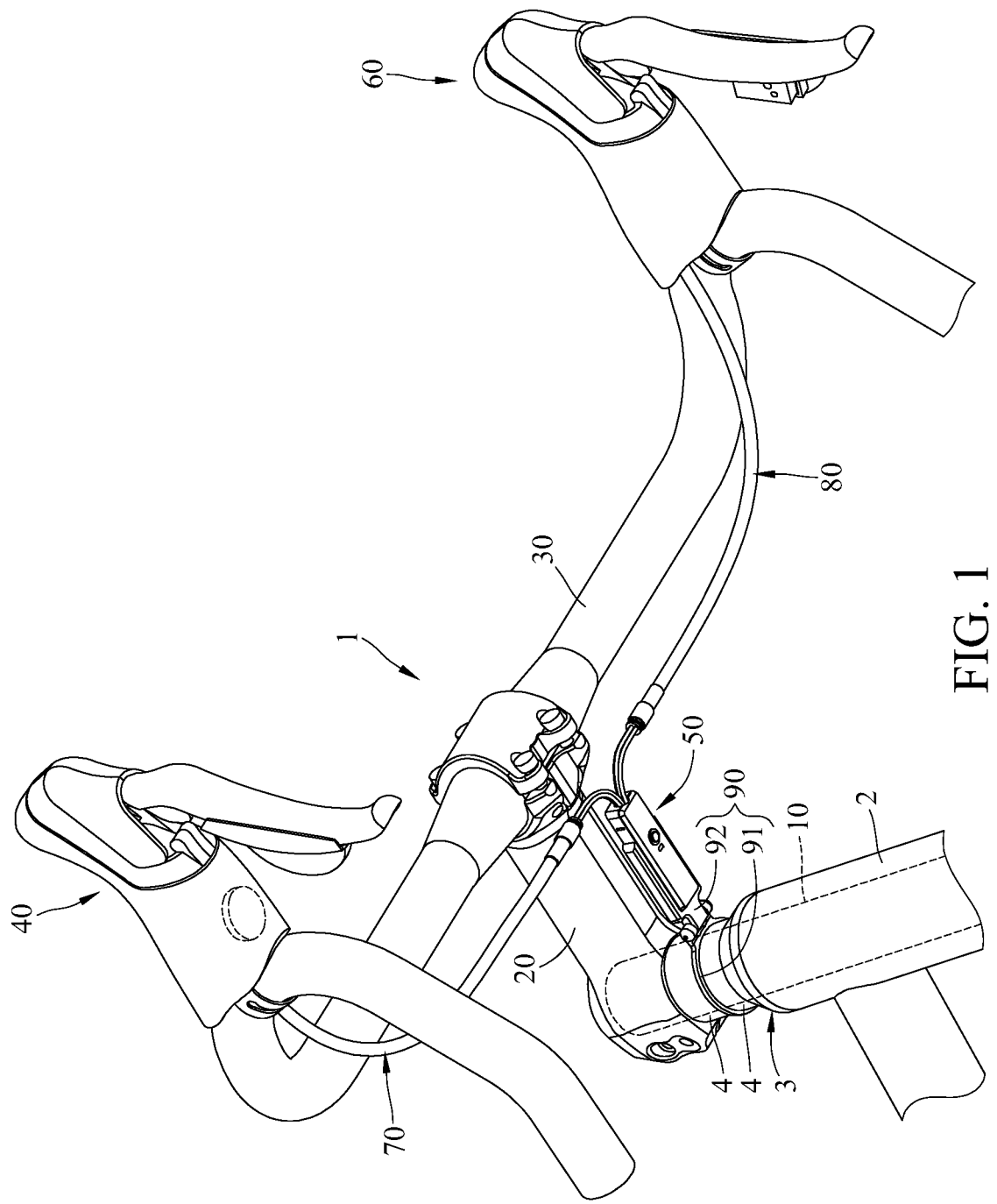
FIG. 1 is a partial perspective view of a bicycle head according to a first embodiment of the disclosure applied on a bicycle frame.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIG. 1, there is shown a perspective view of a bicycle head 1 according to a first embodiment of the disclosure applied on a bicycle frame 2.

As shown, the bicycle head 1 is configured to be mounted on a bicycle frame 2 and may include a vertical tube 10, a stem 20, a handlebar 30, a first brake lever assembly 40, and a shift control box 50. In addition, in this or another embodiment, the bicycle head 1 may further include a second brake lever assembly 60 and two cables 70 and 80.

The vertical tube 10 is mounted on the bicycle frame 2 via, for example, a headset 3 and with two gaskets 4 sleeved thereon. Two opposite ends of the stem 20 are respectively fixed to the vertical tube 10 and the handlebar 30.

The first brake lever assembly 40 and the second brake lever assembly 60 are respectively mounted on two opposite sides of the handlebar 30 and therefore may be served as right and left brake lever assemblies for a bicycle.

Figure 2:
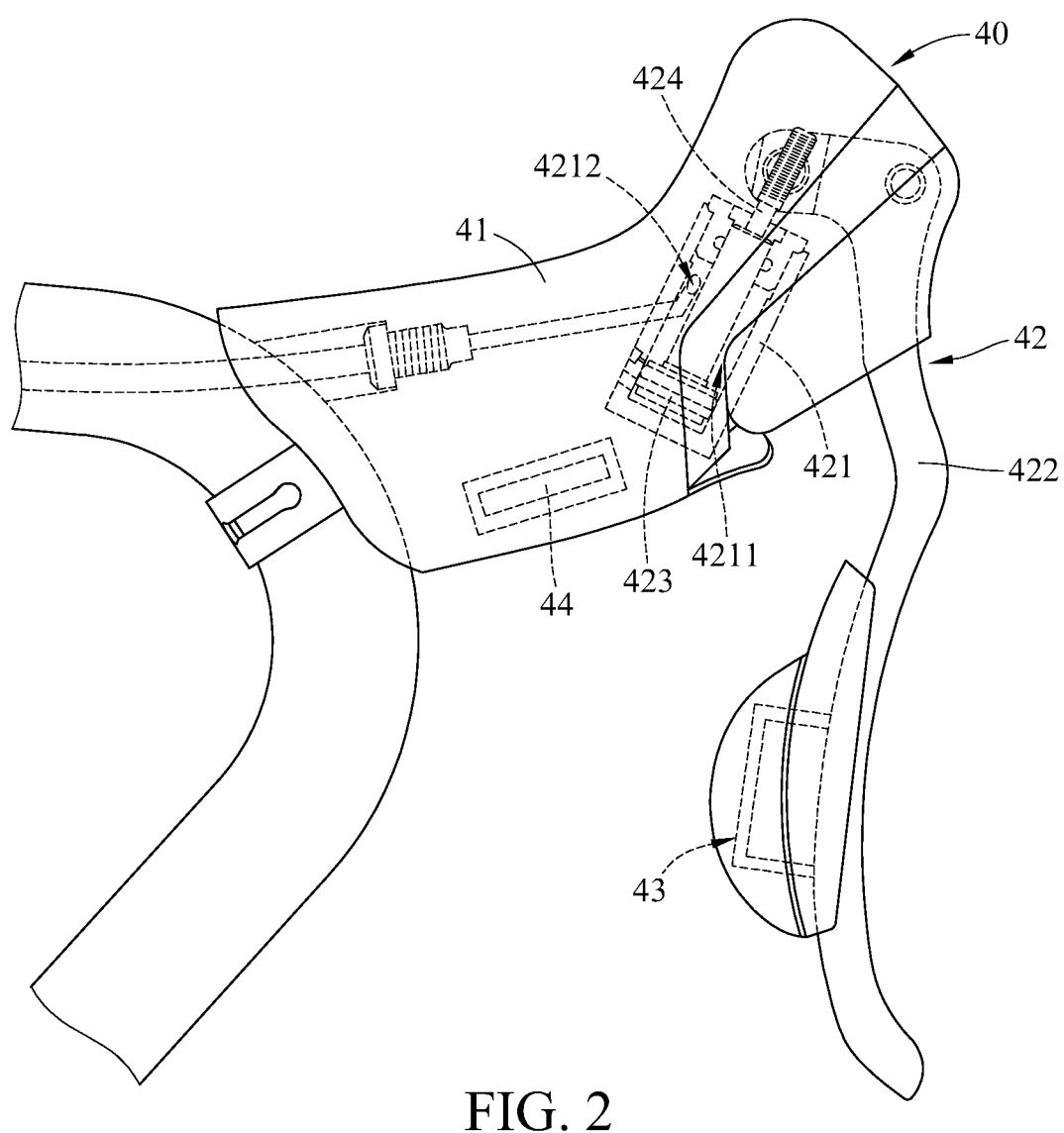
FIG. 2 is a schematic view of a first brake lever assembly of the bicycle head in FIG. 1.

Then, referring to FIG. 2, a schematic view of the first brake lever assembly 40 of the bicycle head 1 is shown.

As shown, the first brake lever assembly 40 includes a main body 41, a brake assembly 42, a shift switch 43, and a battery 44. The brake assembly 42 is disposed on the main body 41. The brake assembly 42 includes a tank 421, a lever 422, a piston 423, and a link 424. The tank 421 and part of the lever 422 are located in the main body 41, and the lever 422 is pivotable relative to the tank 421 and the main body 41. The tank 421 has a pressure chamber 4211 and an oil outlet 4212 in fluid communication with each other. The piston 423 is movably located in the pressure chamber 4211 of the tank 421. Two opposite ends of the link 424 are respectively connected to the piston 423 and the lever 422. The oil outlet 4212 of the tank 421 and the link 424 are located at the same side of the piston 423. The oil outlet 4212 of the tank 421 is in fluid communication with a bicycle caliper (not shown) via, for example, a pipe (not shown). The shift switch 43 is disposed on the lever 422 of the brake assembly 42. The battery 44 is disposed in the main body 41 of the first brake lever assembly 40.

In this embodiment, when the lever 422 is pressed, the lever 422 forces the piston 423 to move with respect to the pressure chamber 4211 of the tank 421 via the link 424, such that oil is squeezed out of the pressure chamber 4211 from the oil outlet 4212. Thus, the oil flows into the bicycle caliper via the pipe to brake the bicycle. In this embodiment, the first brake lever assembly 40 may be a pull-type first brake lever; specifically, when activating the lever 422 to brake the bicycle, the lever 422 pulls the link 424 so as to move the piston 423 away from the bottom of the pressure chamber 4211.

Figure 3:
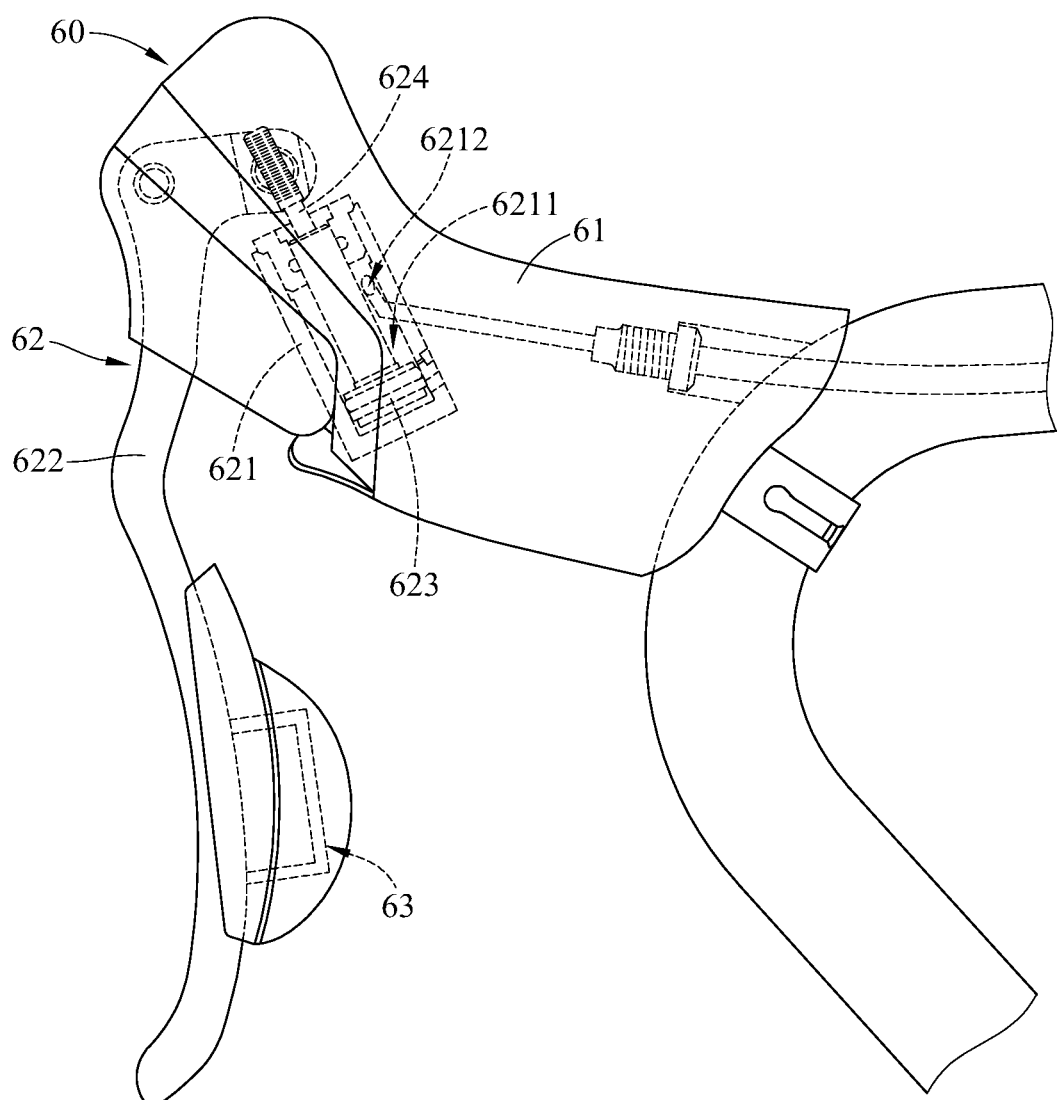
FIG. 3 is a schematic view of a second brake lever assembly of the bicycle head in FIG. 1.
Figure 4:
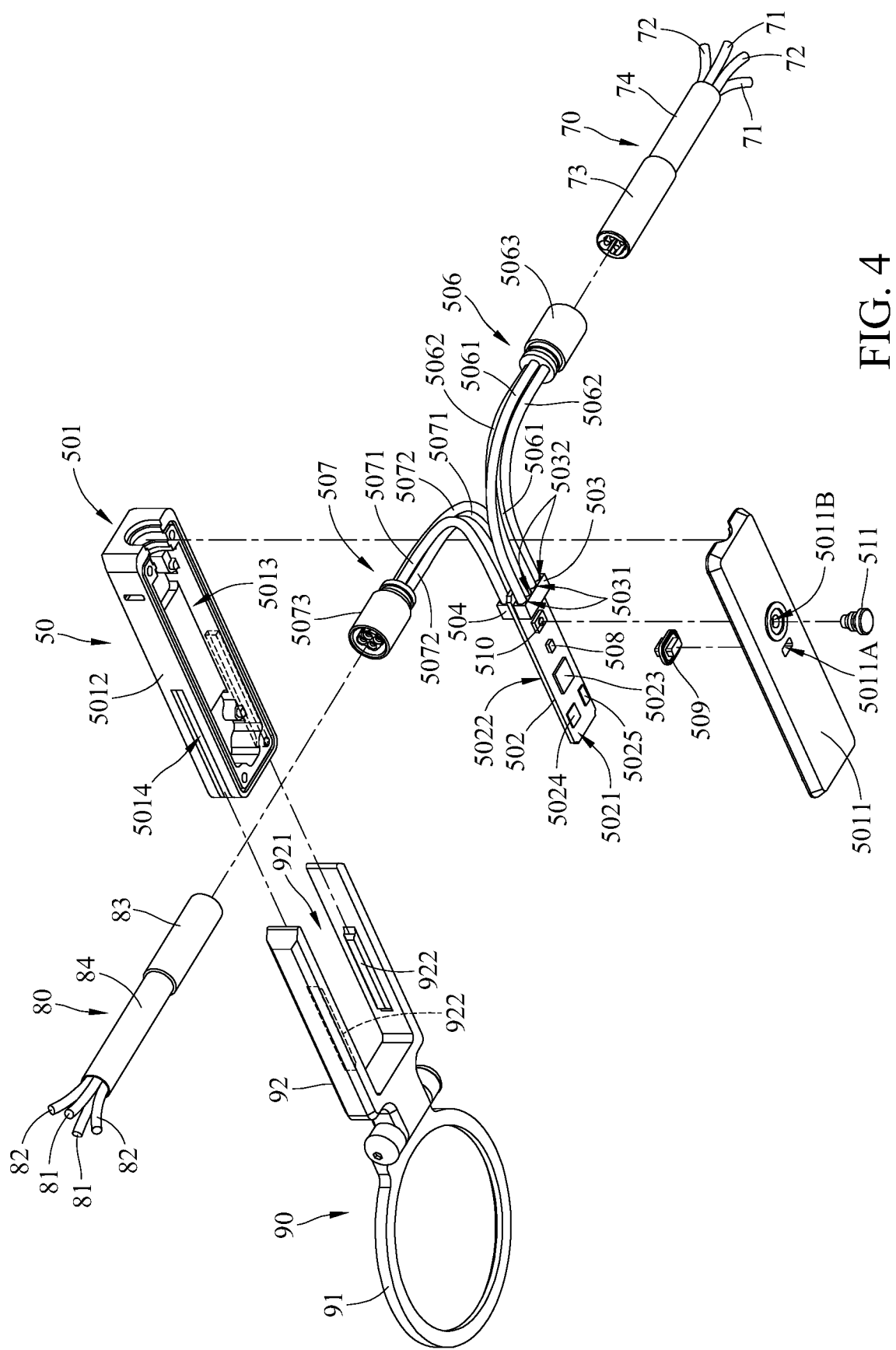
FIG. 4 is an exploded view of a shift control box and cables of the bicycle head in FIG. 1.

Then, referring to FIG. 3, there is shown a schematic view of the second brake lever assembly 60 of the bicycle head 1.

The second brake lever assembly 60 includes a main body 61, a brake assembly 62, and a shift switch 63. The brake assembly 62 is disposed on the main body 61. The brake assembly 62 includes a tank 621, a lever 622, a piston 623, and a link 624. The tank 621 and a part of the lever 622 are located in the main body 61, and the lever 622 is pivotable relative to the tank 621 and the main body 61. The tank 621 has a pressure chamber 6211 and an oil outlet 6212 in fluid communication with each other. The piston 623 is movably located in the pressure chamber 6211 of the tank 621. Two opposite ends of the link 624 are respectively connected to the piston 623 and the lever 622. The oil outlet 6212 of the tank 621 and the link 624 are located at the same side of the piston 623. The oil outlet 6212 of the tank 621 is in fluid communication with another bicycle caliper (not shown) via, for example, a pipe (not shown). The shift switch 63 is disposed on the lever 622 of the brake assembly 62.

In this embodiment, the second brake lever assembly 60 and the first brake lever assembly 40 are similar in configuration, thus they work in the same or similar manner.

Then, referring to FIGS. 2 to 5, schematic views of the first brake lever assembly 40 and the second brake lever assembly 60 and exploded views of the shift control box 50 and the cables 70 and 80 are provided.

In this embodiment, the shift control box 50 is disposed on the vertical tube 10, the details thereof are given below.

In detail, the bicycle head 1 further includes a mount component 90, the mount component 90 include a sleeve portion 91 and an accommodation portion 92 pivotably connected to the sleeve portion 91, the sleeve portion 91 is sleeved on the vertical tube 10 and is, for example, located between and clamped by the gaskets 4, and the accommodation portion 92 is located below the stem 20. When the bicycle stands on the ground, the accommodation portion 92 is located closer to the ground than the stem 20. The accommodation portion 92 has an insertion space 921 and two guide ribs 922 located in the insertion space 921 and opposite to each other.

The shift control box 50 includes a casing 501, a circuit board 502, and two electrical connectors 503 and 504. The casing 501 includes a first part 5011 and a second part 5012. The first part 5011 and the second part 5012 are assembled to each other and define an accommodation space 5013 therebetween.

The circuit board 502 is disposed in the accommodation space 5013. The circuit board 502 has a first surface 5021, a second surface 5022, a control unit 5023, a motion sensing unit 5024, and a wireless transmission unit 5025. The first surface 5021 is located opposite to the second surface 5022 of the circuit board 502. The control unit 5023, the motion sensing unit 5024, and the wireless transmission unit 5025 are located at the first surface 5021 of the circuit board 502, and the motion sensing unit 5024 and the wireless transmission unit 5025 are electrically connected to the control unit 5023. The motion sensing unit 5024 is, for example, a G-sensor. The wireless transmission unit 5025 is, for example, a Bluetooth transceiver. In this embodiment, the control unit 5023 may be electrically connected to a front derailleur and a rear derailleur (not shown) via the wireless transmission unit 5025. The electrical connectors 503 are respectively disposed on the first surface 5021 and the second surface 5022 of the circuit board 502, and both of them are located at one end of the circuit board 502 located away from the vertical tube 10. The electrical connectors 503 and 504 are electrically connected to the control unit 5023.

The second part 5012 of the shift control box 50 has two guide grooves 5014 located opposite to each other and respectively mating the guide ribs 922 of the accommodation portion 92 of the mount component 90. The guide ribs 922 are slidably engaged in the guide grooves 5014, such that the casing 501 is slidably disposed on the accommodation portion 92 of the mount component 90. In other words, the shift control box 50 is disposed on the vertical tube 10 via the mount component 90.

In this embodiment, the shift control box 50 can be installed on or removed from the accommodation portion 92 of the mount component 90 by sliding with respect to the accommodation portion 92. Also, since the accommodation portion 92 is pivotable relative to the sleeve portion 91, the angle of the shift control box 50 to the stem 20 is also adjustable.

In this embodiment, the battery 44 and the shift switch 43 of the first brake lever assembly 40 are electrically connected to the electrical connector 503 via the cable 70. Specifically, the electrical connector 503 includes two power ports 5031 and two signal ports 5032, and the power ports 5031 and the signal ports 5032 are spaced apart from one another. The cable 70, for example, includes two power wires 71, two signal wires 72, a connector 73, and an insulator 74. Ends of the power wires 71 and the signal wires 72 are connected to the connector 73, and the other ends of the power wires 71 and the signal wires 72 are electrically connected to the battery 44 and the shift switch 43. The insulator 74 wraps the power wires 71 and the signal wires 72. The shift control box 50 may further include an extension component 506. The extension component 506, for example, includes two power wires 5061, two signal wires 5062, and a connector 5063. Ends of the power wires 5061 and the signal wires 5062 are connected to the connector 5063, and the other ends of the power wires 5061 and the signal wires 5062 are respectively and electrically connected to the power ports 5031 and the signal ports 5032. The connector 73 of the cable 70 and the connector 5063 of the extension component 506 are, for example, male and female connectors mating with each other. The connector 73 of the cable 70 is connected to the connector 5063 of the extension component 506, such that the power wires 71 and the signal wires 72 are respectively and electrically connected to the power ports 5031 and the signal ports 5032 via the power wires 5061 and the signal wires 5062 of the extension component 506.

Similarly, the shift switch 63 of the second brake lever assembly 60 is electrically connected to the electrical connector 504 via the cable 80. The electrical connector 504 includes two power ports 5041 and two signal ports 5042, and the power ports 5041 and the signal ports 5042 are spaced apart from each other. The cable 80, for example, includes two power wires 81, two signal wires 82, a connector 83, and an insulator 84. Ends of the power wires 81 and the signal wires 82 are connected to the connector 83, and the other ends of the power wires 81 and the signal wires 82 are electrically connected to the shift switch 63. The insulator 84 wraps the power wires 81 and the signal wires 82. The shift control box 50 may further include another extension component 507. The extension component 507, for example, includes two power wires 5071, two signal wires 5072, and a connector 5073. Ends of the power wires 5071 and the signal wires 5072 are connected to the connector 5073, and the other ends of the power wires 5071 and the signal wires 5072 are respectively and electrically connected to the power ports 5041 and the signal ports 5042. The connector 83 of the cable 80 and the connector 5073 of the extension component 507 are, for example, male and female connectors mating with each other. The connector 83 of the cable 80 is connected to the connector 5073 of the extension component 507, such that the power wires 81 and the signal wires 82 are respectively and electrically connected to the power ports 5041 and the signal ports 5042 of the electrical connector via the power wires 5071 and the signal wires 5072 of the extension component 507.

When the shift switch 43 of the first brake lever assembly 40 is activated, the shift switch 43 produces a shift signal, and the shift signal is transmitted to the control unit 5023 of the shift control box 50 via the signal wire 72 of the cable 70. Then, the control unit 5023 of the shift control box 50 commands the wireless transmission unit 5025 to transmit the shift signal to one of the front derailleur and the rear derailleur for shifting such derailleur. Similarly, when the shift switch 63 of the second brake lever assembly 60 is activated, the shift switch 63 produces a shift signal, and the shift signal is transmitted to the control unit 5023 of the shift control box 50 via the signal wire 82 of the cable 80. Then, the control unit 5023 of the shift control box 50 command the wireless transmission unit 5025 to transmit the shift signal to the other one of the front derailleur and the rear derailleur for shifting such derailleur.

In this embodiment, the battery 44 disposed in the main body 41 of the first brake lever assembly 40 is to provide electricity to the shift switch 43 of the first brake lever assembly 40, the shift switch 63 of the second brake lever assembly 60, and the shift control box 50.

Furthermore, the shift control box 50 further includes a light-emitting component 508, a light guide 509, a control switch 510, and a button 511. The first part 5011 has a first opening 5011A and a second opening 5011B spaced apart from each other. The light-emitting component 508 and the control switch 510 are disposed on the circuit board 502 and are respectively aligned with the first opening 5011A and the second opening 5011B. The light guide 509 and the button 511 are respectively disposed at the first opening 5011A and the second opening 5011B. The control switch 510 is, for example, a switch for controlling the activation or inactivation of the shift control box 50. The light-emitting component 508 turning on and off may respectively indicate the activation and the inactivation of the shift control box 50.

In this embodiment, the battery 44 is disposed in the main body 41 of the first brake lever assembly 40 and is electrically connected to the shift control box 50. In this arrangement, the shift control box 50 has no need to accommodate the battery 44 so that its size may be reduced as possible without considering the battery 44. Therefore, the shift control box 50 can be lightweight and small and therefore does not affect the appearance of the bicycle it applied and will not interfere with the operation of the handlebar 30.

In this embodiment, the electrical connectors 503 and 504 are respectively located at the opposite surfaces 5021 and 5022 of the circuit board 502 and are located at the end of the circuit board 502 located away from the vertical tube 10, such that the electrical connectors 503 and 504 can be located close to the shift switch 43 and the battery 44 of the first brake lever assembly 40 and the shift switch 63 of the second brake lever assembly 60, thereby facilitating the arrangements of the cables 70 and 80 and preventing the cables 70 and 80 adversely affecting the appearance of the bicycle.

In addition, the electrical connectors 503 and 504 located in the accommodation space 5013 of the casing 501 are electrically connected to the cables 70 and 80 via the extension components 506 and 507, such that the cables 70 and 80 are not required to be inserted into the casing 501. Therefore, when wrapping tapes, the tapes are merely required to be wrapped on the places where the cables 70 and 80 are respectively connected to the extension component 506 and 507 instead of wrapping on the casing 501, avoiding affecting the appearance of the shift control box 50.

In this embodiment, the position of the sleeve portion 91 may be modified as required; in some other embodiments, the sleeve portion 91 may be located between the stem 20 and the gaskets 4; in such an arrangement, the shift control box 50 is relocated to be closer to the stem 20 along the axial direction of the vertical tube 10. In addition, the quantity and the thickness of the gasket may be modified as required to adjust the positon of the shift control box 50 in the axial direction of the vertical tube 10.

Figure 6:
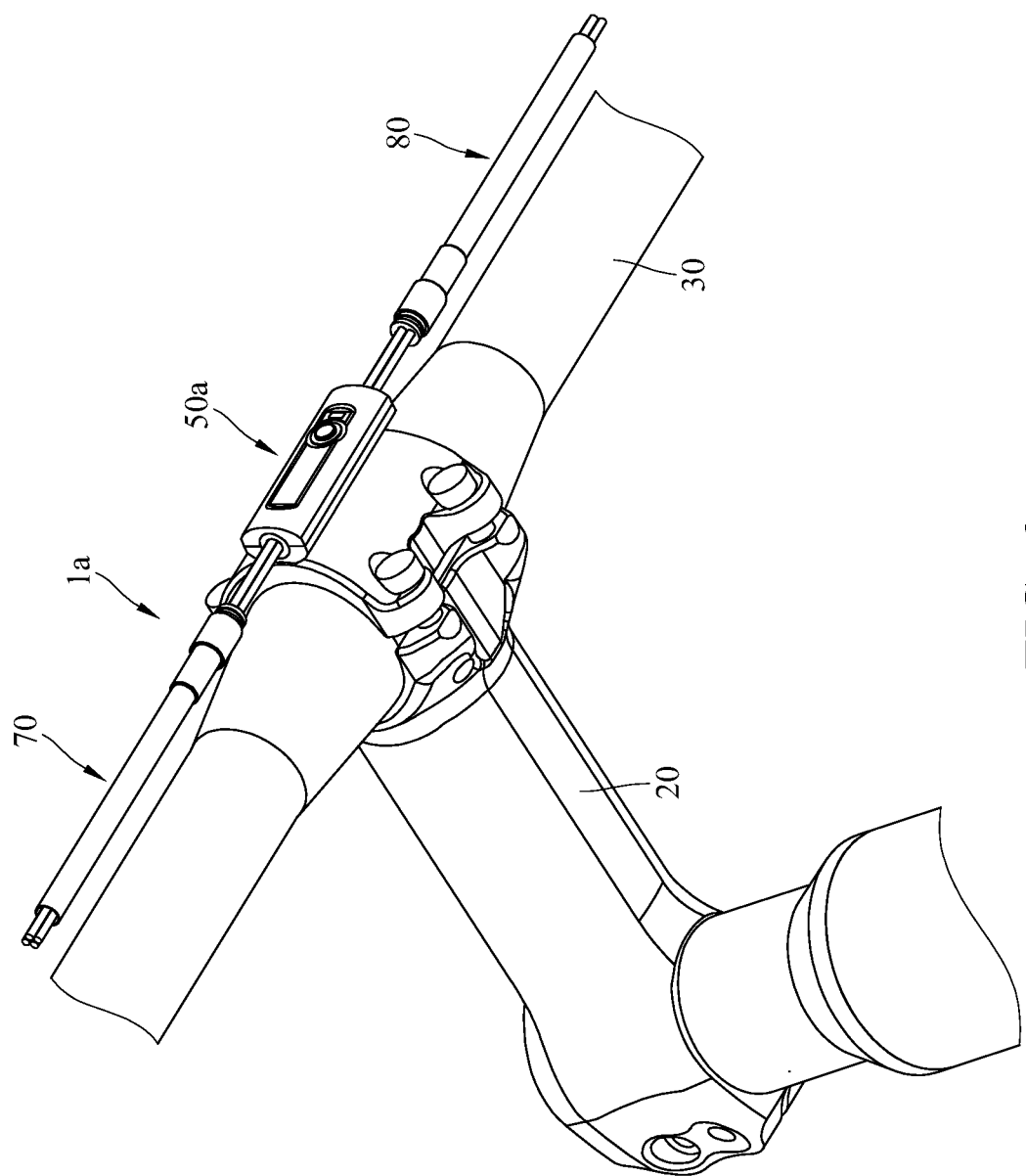
FIG. 6 is a partial and enlarged perspective view of a bicycle head according to a second embodiment of the disclosure applied on a bicycle frame.
Figure 7:
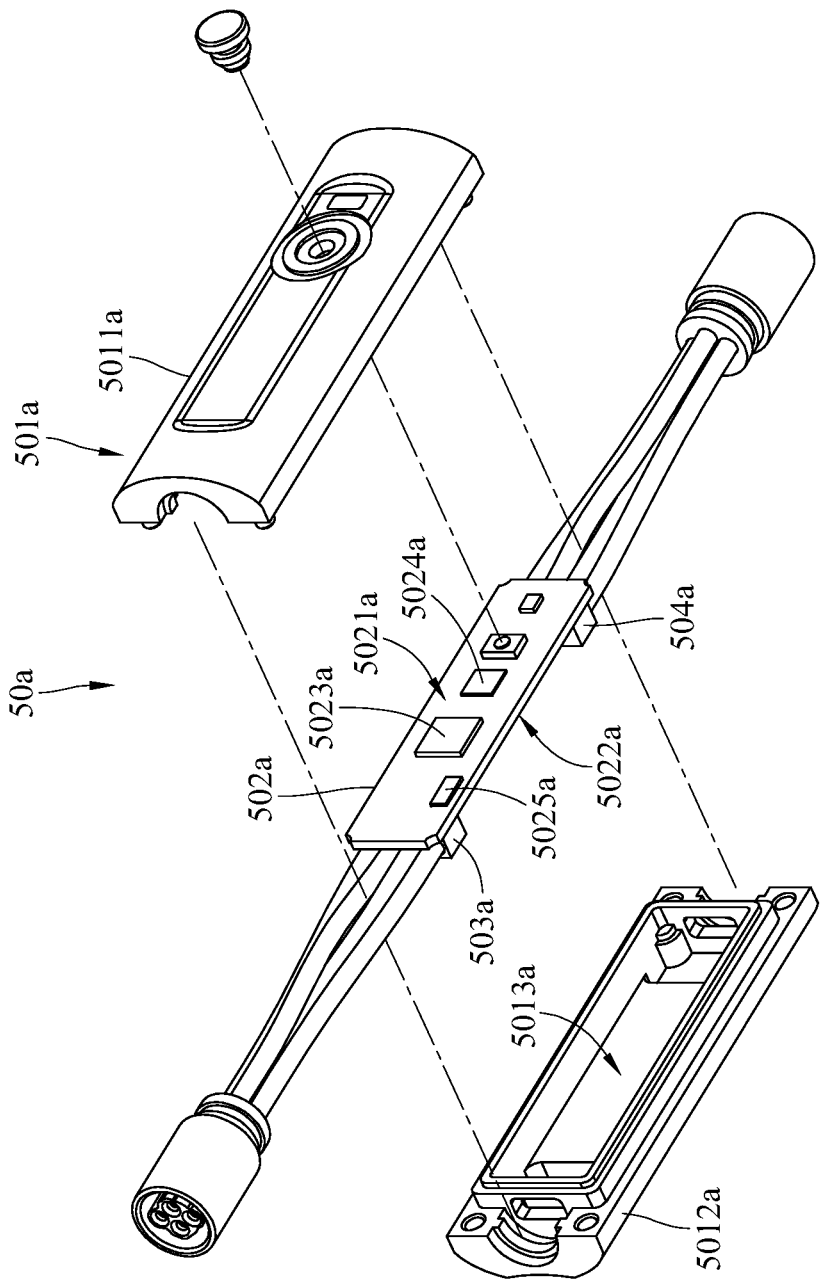
FIG. 7 is an exploded view of a shift control box of the bicycle head in FIG. 1.

Then, referring to FIGS. 6 and 7, there are shown a partial and enlarged perspective view of a bicycle head 1a according to a second embodiment of the disclosure applied on a bicycle frame and an exploded view of a shift control box 50a of the bicycle head 1a.

The bicycle head 1a has a configuration similar to that of the bicycle head 1 of the previous embodiment, thus only the differences between these two embodiments will be described in detail hereinafter. Specifically, in the bicycle head 1a, the positions of the shift control box and its electrical connectors are different from that of the previous embodiment, thus the following paragraphs are mainly for the details of the shift control box of the bicycle head 1a, and the other components and structures may be understood with reference to the aforementioned descriptions.

In this embodiment, the bicycle head 1a includes a shift control box 50a disposed on the handlebar 30 and located at the place where the handlebar 30 is connected to the stem 20. The shift control box 50a includes a casing 501a, a circuit board 502a, and two electrical connectors 503a and 504a. The casing 501a includes a first part 5011a and a second part 5012a. The first part 5011a and the second part 5012a are assembled to each other and define an accommodation space 5013a therebetween. The circuit board 502a is disposed in the accommodation space 5013a of the casing 501a. The circuit board 502a has a first surface 5021a, a second surface 5022a, a control unit 5023a, a motion sensing unit 5024a and a wireless transmission unit 5025a. The first surface 5021a is located opposite to the second surface 5022a of the circuit board 502a. The control unit 5023a, the motion sensing unit 5024a, and the wireless transmission unit 5025a are located at the first surface 5021a of the circuit board 502a, and the motion sensing unit 5024a and the wireless transmission unit 5025a are electrically connected to the control unit 5023a. The electrical connectors 503a and 504a are disposed on the second surface 5022a and located at two opposite sides of the second surface 5022a. The electrical connector 503a is located closer to the first brake lever assembly 40 than the electrical connector 504a. The electrical connectors 503a and 504a are electrically connected to the control unit 5023a. In this embodiment, the control unit 5023a is, for example, electrically connected to a front derailleur (not shown) and a rear derailleur (not shown) via the wireless transmission unit 5025a. The motion sensing unit 5024a is, for example, a G-sensor, and the wireless transmission unit 5025a is, for example, a Bluetooth transceiver.

The battery 44 and the shift switch 43 of the first brake lever assembly 40 (as shown in FIG. 2) are electrically connected to the electrical connector 503a via the cable 70 (as shown in FIG. 1), and the shift switch 63 of the second brake lever assembly 60 (as shown in FIG. 3) is electrically connected to the electrical connector 504a via the cable 80 (as shown in FIG. 1).

In this embodiment, the electrical connectors 503a and 504a are located at two opposite sides of the second surface 5022a of the circuit board 502a, such that the electrical connectors 503a and 504a are respectively located close to the battery 44 and the shift switch 43 of the first brake lever assembly 40 and the shift switch 63 of the second brake lever assembly 60, thereby facilitating the arrangements of the cables 70 and 80 and preventing the cables 70 and 80 adversely affecting the appearance of the bicycle.

Note that the electrical connector 503a is not restricted to located closer to the first brake lever assembly 40 than the electrical connector 504a; in some other embodiments, the electrical connector 503a may located farther away from the first brake lever assembly 40 than the electrical connector 504a. In this case, the battery 44 and the shift switch 43 of the first brake lever assembly 40 may be electrically connected to the electrical connector 504a via the cable 70, and the shift switch 63 of the second brake lever assembly 60 may be electrically connected to the electrical connector 503a via the cable 80.

Figure 8:
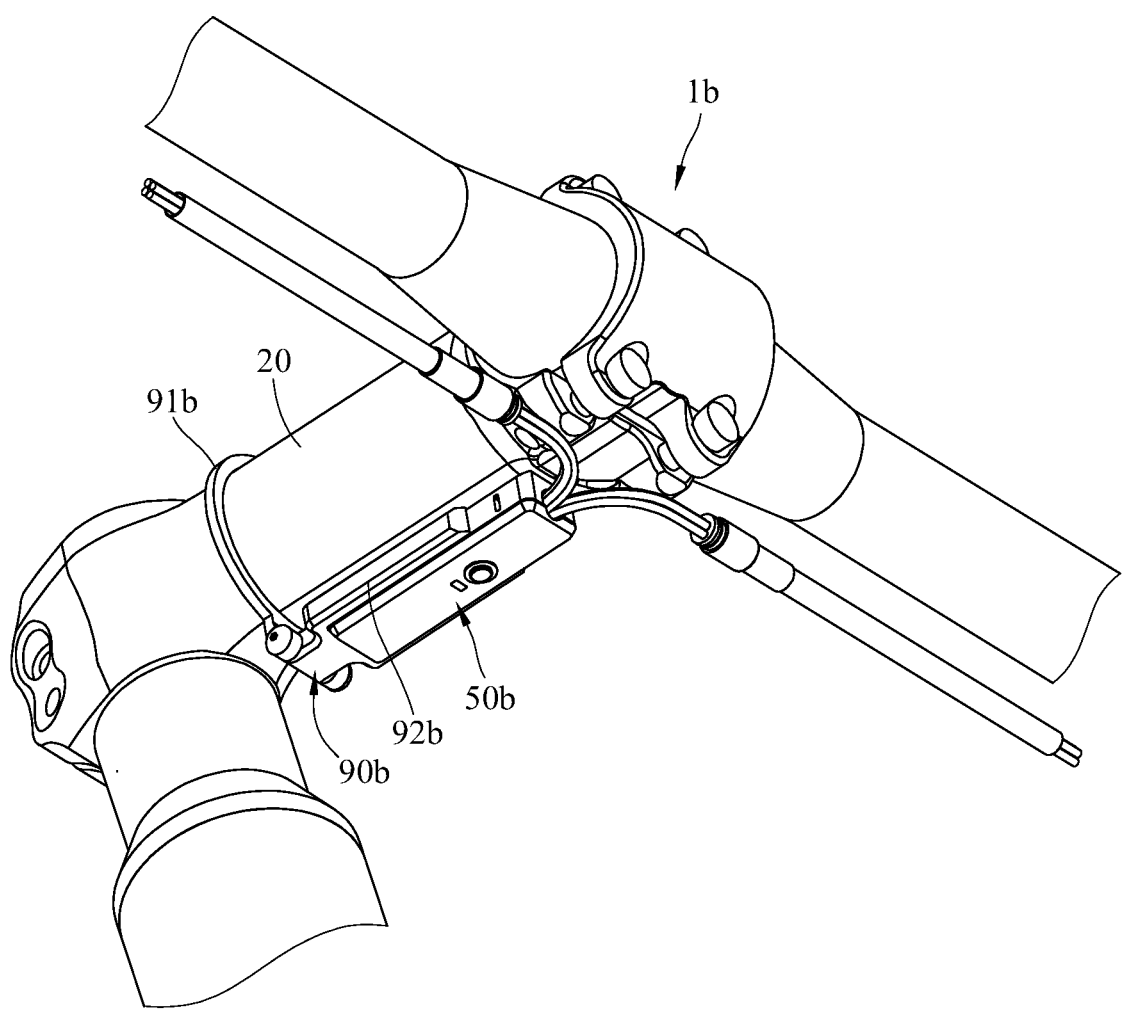
FIG. 8 is a partial and enlarged perspective view of a bicycle head according to a third embodiment of the disclosure applied on a bicycle frame.

Then, referring to FIG. 8, there is shown a partial and enlarged perspective view of a bicycle head 1b according to a third embodiment of the disclosure applied on a bicycle frame.

The bicycle head 1b has a configuration similar to that of the bicycle head 1 of the previous embodiment, thus only the differences between these two embodiments will be described in detail hereinafter. Specifically, in the bicycle head 1b, the position of the shift control box is different from that of the previous embodiment, thus the following paragraphs are mainly for the details of the shift control box of the bicycle head 1b, and the other components and structures may be understood with reference to the aforementioned descriptions.

In this embodiment, a shift control box 50b is disposed on the stem 20 via a mount component 90b. Specifically, a sleeve portion 91b of the mount component 90b is sleeved on the stem 20, and an accommodation portion 92b of the mount component 90b is located below the stem 20. The shift control box 50b is mounted on the accommodation portion 92b of the mount component 90b, such that the shift control box 50b is also located below the stem 20.

Figure 9:
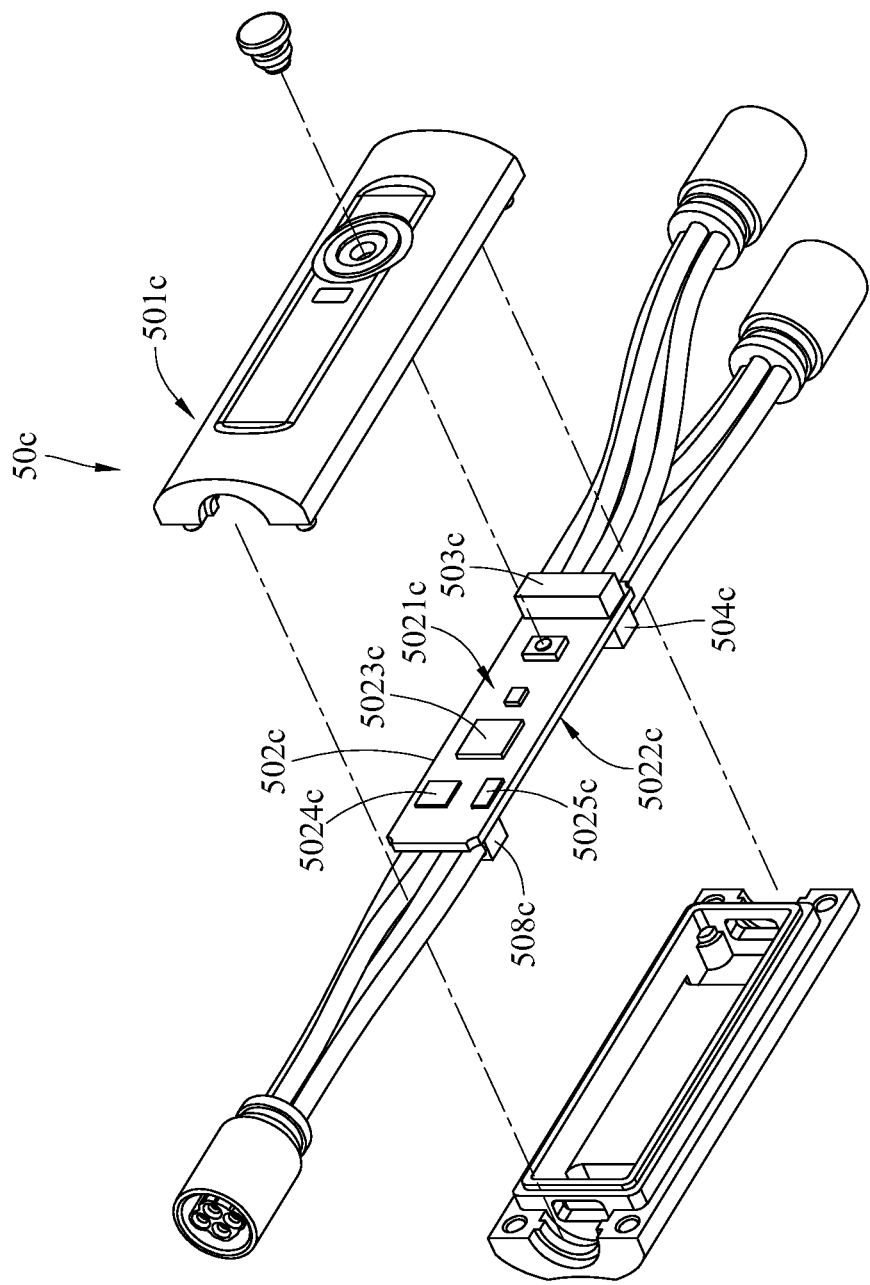
FIG. 9 is an exploded view of a shift control box according to a fourth embodiment of the disclosure.

Then, referring to FIG. 9, there is shown an exploded view of a shift control box 50c according to a fourth embodiment of the disclosure.

The shift control box 50c has a configuration similar to that of the shift control box 50 of the previous embodiment, thus only the differences between these two embodiments will be described in detail hereinafter. Specifically, in the shift control box 50c, the quantity of the electrical connectors of the shift control box is different from that of the previous embodiment, thus the following paragraphs are mainly for the arrangements of the electrical connectors of the shift control box, and the other components and structures may be understood with reference to the aforementioned descriptions.

In this embodiment, the shift control box 50c includes three electrical connectors 503c, 504c, and 508c. The electrical connectors 503c and 504c are respectively located a first surface 5021c and a second surface 5022c of the circuit board 502c and located at the one end of the circuit board 502c. The electrical connectors 504c and 508c are respectively located at two opposite sides of the second surface 5022c of the circuit board 502c. A control unit 5023c, a motion sensing unit 5024c and a wireless transmission unit 5025c of the circuit board 502c are, for example, located at the first surface 5021c of the circuit board 502c, but the disclosure is not limited thereto; in some other embodiments, the control unit, the motion sensing unit, and the wireless transmission unit of the circuit board may be located at the second surface of the circuit board.

In this embodiment, according to the position of the shift control box 50c, the battery 44 and the shift switch 43 of the first brake lever assembly 40 (as shown in FIG. 2) are electrically connected to one of the electrical connectors 503*c*, 504*c*, and 508*c*, and the shift switch 63 of the second brake lever assembly 60 is electrically connected to one of the other two of the electrical connectors.

Figure 5:
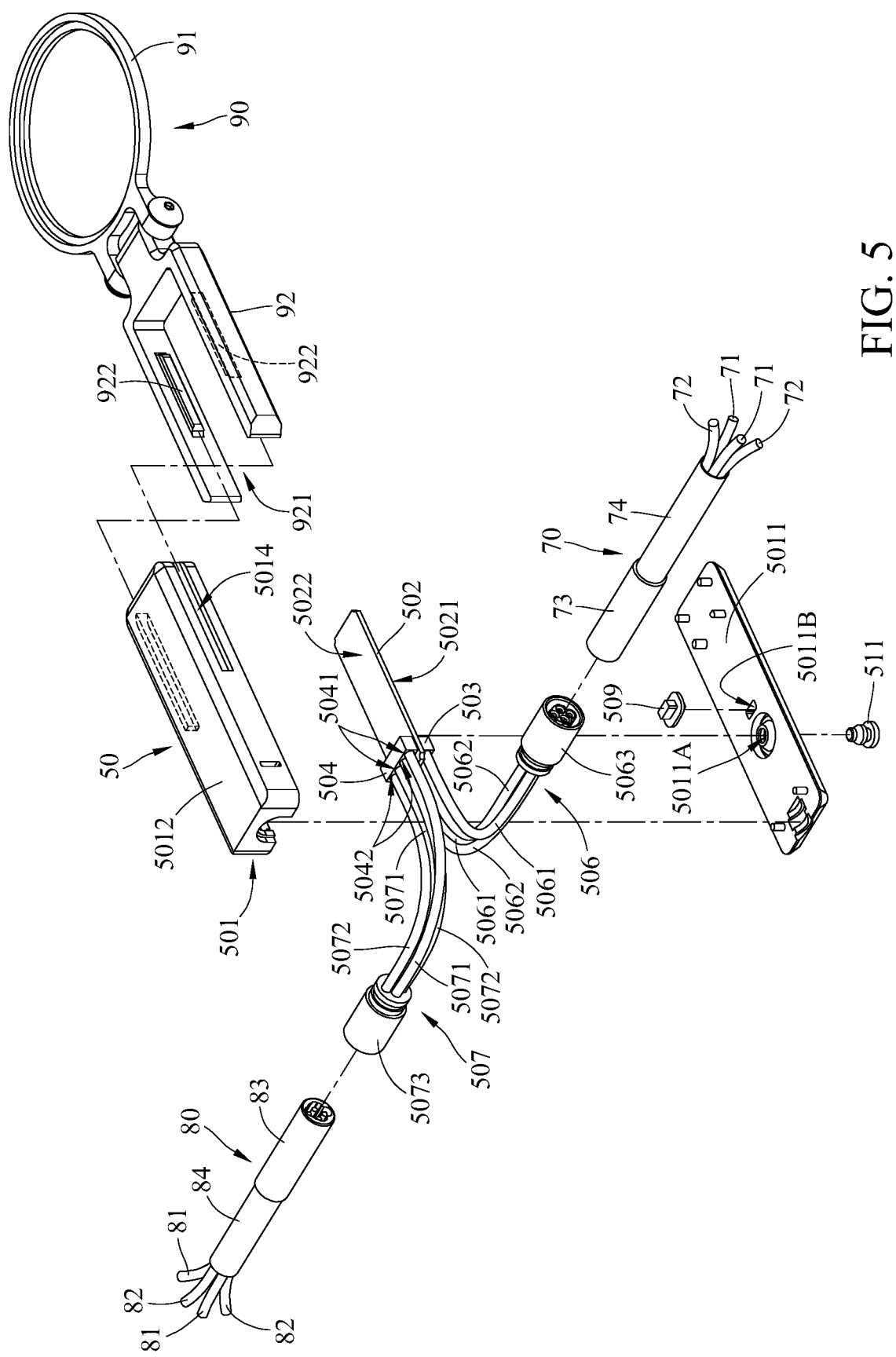
FIG. 5 is another exploded view of the shift control box and the cables of the bicycle head in FIG. 1.

For example, in a case that the shift control box 50*c* is mounted on the handlebar 30 (as shown in FIG. 6), and the electrical connectors 503*c* and 504*c* are located closer to the first brake lever assembly 40 than the electrical connector 508*c*, the battery 44 and the shift switch 43 of the first brake lever assembly 40 can be electrically connected to one of the electrical connectors 503*c* and 504*c*, and the shift switch 63 of the second brake lever assembly 60 can be electrically connected to the electrical connector 508*c*. Similarly, in another case that the shift control box 50*c* is mounted on the handlebar 30, and the electrical connectors 503*c* and 504*c* are located closer to the second brake lever assembly 60 than the electrical connector 508*c*, the battery 44 and the shift switch 43 of the first brake lever assembly 40 can be electrically connected to the electrical connector 508*c*, and the shift switch 63 of the second brake lever assembly 60 can be electrically connected to one of the electrical connectors 503*c* and 504*c*. On the other hand, in still another case that the shift control box 50*c* is located below the stem 20 (as shown in FIG. 5 or 7), the battery 44 and the shift switch 43 of the first brake lever assembly 40 can be electrically connected to one of the electrical connectors 503*c* and 504*c*, and the shift switch 63 of the second brake lever assembly 60 can be electrically connected to the other one of the electrical connectors 503*c* and 504*c*.

In this embodiment, the quantity of the electrical connectors of the shift control box is three, and the electrical connectors 503*c* and 504*c* are respectively located at the first surface 5021*c* and the second surface 5022*c* of the circuit board 502*c* and located at the same end of the circuit board 502*c*, and the electrical connectors 504*c* and 508*c* are located at the two opposite sides of the second surface 5022*c* of the circuit board 502*c*, such that the arrangements of the cables is still facilitated when the shift control box 50*c* is disposed at different positons.

Figure 10:
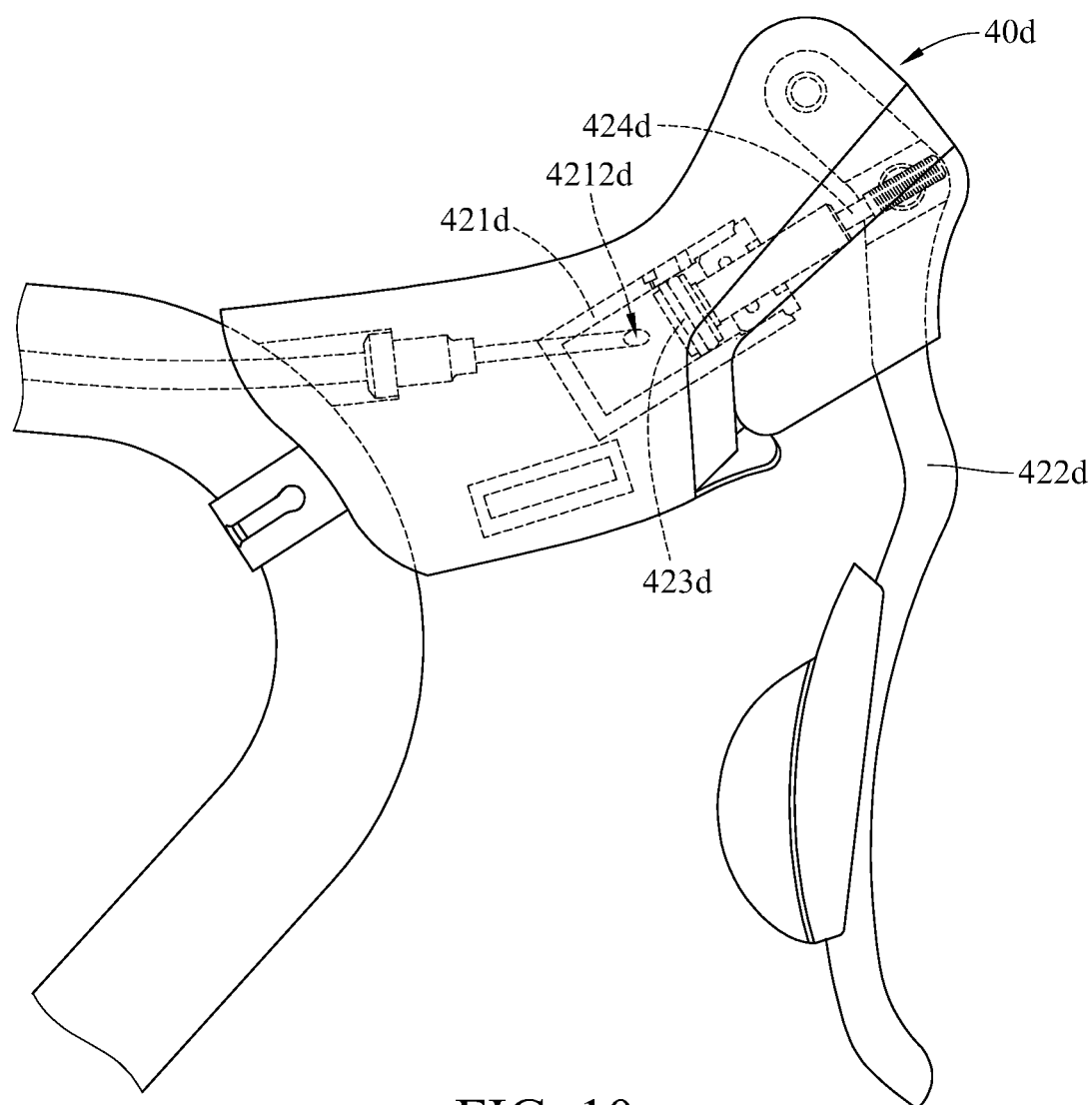
FIG. 10 is a schematic view of a first brake lever assembly according to a fifth embodiment of the disclosure.

Note that the positon of oil outlet of the tank of the first brake lever assembly may be modified as require. Referring to FIG. 10, there is shown a schematic view of a first brake lever assembly 40*d* according to a fifth embodiment of the disclosure.

The first brake lever assembly 40*d* has a configuration similar to that of the first brake lever assembly 40 of the previous embodiment, thus only the differences between these two embodiments will be described in detail hereinafter. Specifically, in the first brake lever assembly 40*d*, the position of the oil outlet of the first brake lever assembly is different from that of the previous embodiment, thus the following paragraphs are mainly for the details of the oil outlet of the first brake lever assembly, and the other components and structures may be understood with reference to the aforementioned descriptions.

In the first brake lever assembly 40*d*, a piston 423*d* is located between a link 424*d* and an oil outlet 4212*d* of a tank 421*d*. When the lever 422*d* is pressed, the lever 422*d* forces the piston 423*d* to move with respect to a pressure chamber 4211 of the tank 421*d* via the link 424*d*, such that oil is squeezed out of the pressure chamber 4211 from the oil outlet 4212. This, the oil flows into the bicycle caliper via the pipe to brake the bicycle. In this embodiment, the first brake lever assembly 40*d* may be a push-type first brake lever; specifically, when activating the lever 422*d* to brake the bicycle, the lever 422*d* pushes the link 424*d* so as to move the piston 423*d* towards the bottom of the pressure chamber 4211*d*.

Note that the type of the second brake lever assembly 60 (as shown in FIG. 3) may be modified as required; in some other embodiments, the second brake lever assembly may be a push-type brake lever assembly similar with the first brake lever assembly 40*d*.

Figure 11:
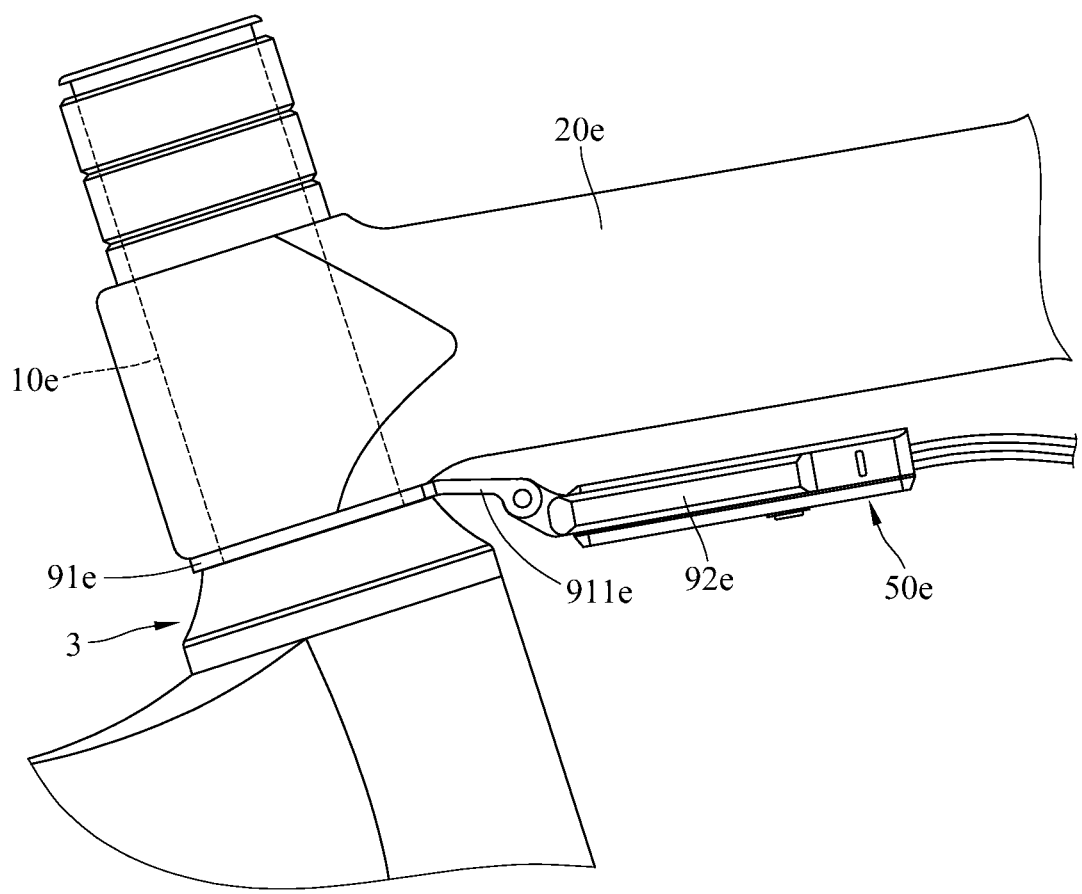
FIG. 11 is a partial and enlarged side view of a bicycle head according to a sixth embodiment of the disclosure.
Figure 12:
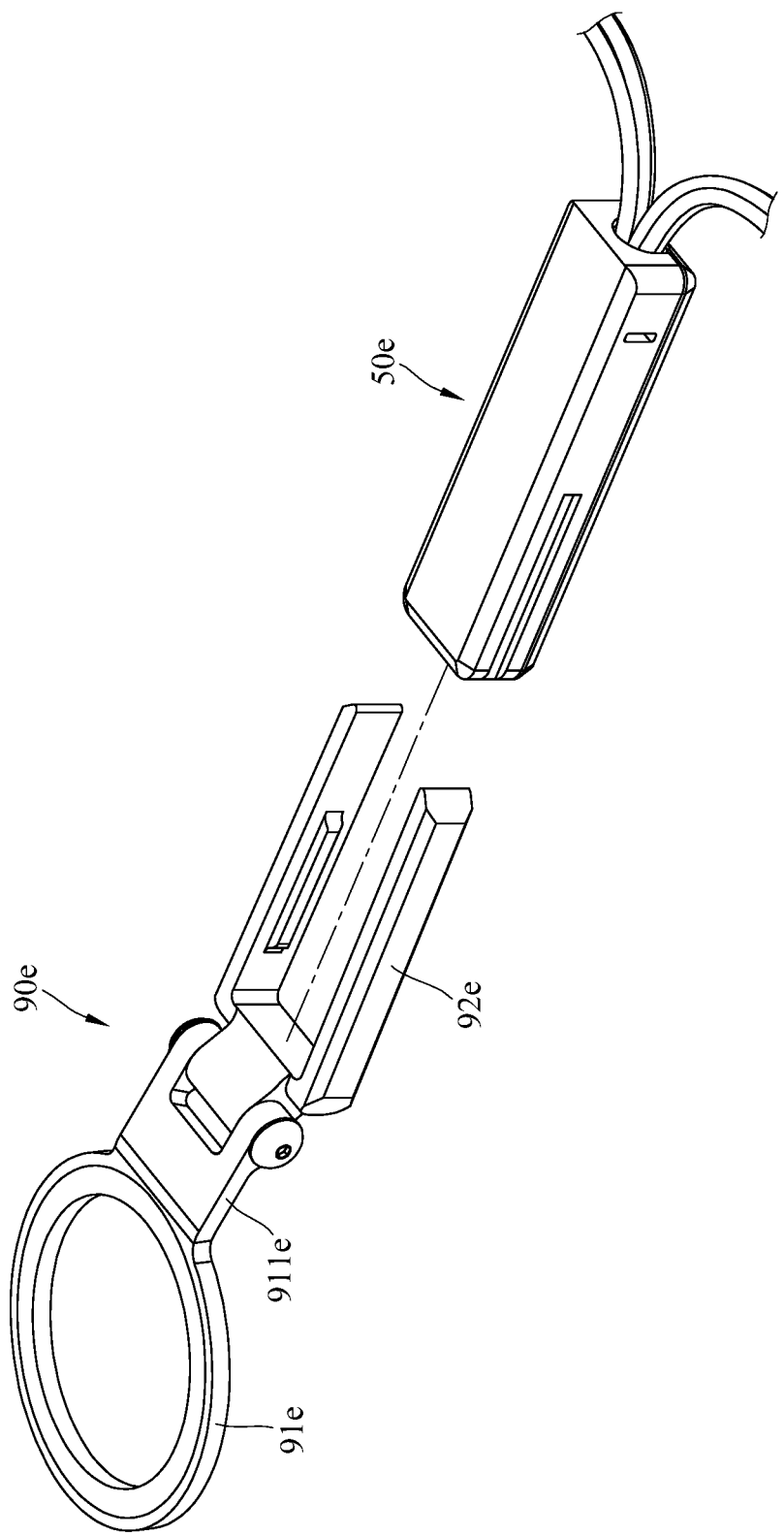
FIG. 12 is an exploded view of a mount component and a shift control box of the bicycle head in FIG. 11.

Then, referring to FIGS. 11 and 12, there are shown a partial and enlarged side view of a bicycle head according to a sixth embodiment of the disclosure and an exploded view of a mount component and a shift control box of the bicycle head in FIG. 11.

The bicycle head of this embodiment has a configuration similar to that of the bicycle head 1 of the previous embodiment, thus only the differences between these two embodiments will be described in detail hereinafter, and the other components and structures may be understood with reference to the aforementioned descriptions.

In this embodiment, a mount component 90*e* includes a sleeve portion 91*e* and an accommodation portion 92*e*. The sleeve portion 91*e* has an inclined extension portion 911*e*. The accommodation portion 92*e* is pivotably disposed on the inclined extension portion 911*e* of the sleeve portion 91*e*. The sleeve portion 91*e* is sleeved on the vertical tube 10*e* and located between and clamped by the stem 20*e* and the headset 3. A shift control box 50*e* is mounted on the accommodation portion 92*e* of the mount component 90*e*.

In this embodiment, the shift control box 50*e* can be adapted to the stem having different inclined angle by pivoting the accommodation portion 92*e*. In addition, the inclined extension portion 911*e* of the sleeve portion 91*e* allows the shift control box 50*e* mounted on the accommodation portion 92*e* to be close to the inclined stem 20*e* as possible, thereby providing an aesthetic bicycle head.

Note that the quantity of the electrical connectors of the shift control box is not restricted to be plural and may be modified as required; in some other embodiments, the shift control box may include only one electrical connector. In such a case, one of the control unit, the motion sensing unit, and the wireless transmission unit and this electrical connector are respectively located at two opposite surfaces of the circuit board.

Note that the quantity of the power ports and the signal ports of the electrical connector may be modified as required; in some other embodiments, the electrical connector may have only one power port and only one signal port.

In another embodiment of the disclosure, the position of the shift control box is different from the position of the battery electrically connected to the shift control box. For example, the shift control box may be disposed on one of the vertical tube, the stem, and the handlebar, and the battery may be disposed on another one of the vertical tube, the stem, and the handlebar, such that the shift control box is not required to accommodate the battery so as to have a small size as possible. Correspondingly, the sizes of the components fixing, positioning, or accommodating the shift control box may be reduced.

According to the bicycle heads and the shift control boxes as discussed in the above embodiments, the battery is electrically connected to the shift control box and is disposed in the main body of the first brake lever assembly; that is, the battery for the shift control box is not accommodated in the shift control box. Thus, the size of the shift control box has no need to consider the battery. As such, the shift control box may be lightweight and small as possible and therefore does not affect the appearance of the bicycle it applied and will not interfere with the operation of the handlebar.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle head, configured to be mounted on a bicycle frame, comprising:
   a vertical tube;
   a stem, wherein one end of the stem is mounted on the vertical tube;
   a handlebar, fixed to another end of the stem;
   a first brake lever assembly, mounted on the handlebar, wherein the first brake lever assembly comprises a main body, a brake assembly, a shift switch, and a battery, the brake assembly and the battery are disposed on the main body, and the shift switch is disposed on the brake assembly; and
   a shift control box, disposed on one of the vertical tube, the stem, and the handlebar and electrically connected to the battery and the shift switch;
   wherein the shift control box comprises a casing, a circuit board, a light-emitting component, a light guide, a control switch, and a button, the circuit board is disposed in the casing, the casing has a first opening and a second opening spaced apart from each other, the light-emitting component and the control switch are disposed on the circuit board and are respectively aligned with the first opening and the second opening, and the light guide and the button are respectively disposed at the first opening and the second opening.

2. The bicycle head according to claim 1, wherein the shift control box comprises at least one electrical connector, the circuit board has a control unit, a motion sensing unit, and a wireless transmission unit, the at least one electrical connector is disposed on the circuit board, the at least one electrical connector and one of the control unit, the motion sensing unit, and the wireless transmission unit are respectively located two opposite surfaces of the circuit board, and the battery and the shift switch are electrically connected to the at least one electrical connector.

3. The bicycle head according to claim 2, further comprising a second brake lever assembly mounted on the handlebar, wherein the second brake lever assembly comprises a main body, a brake assembly, and a shift switch, the brake assembly of the second brake lever assembly is disposed on the main body of the second brake lever assembly, the shift switch of the second brake lever assembly is disposed on the brake assembly of the second brake lever assembly, the at least one electrical connector comprises two electrical connectors, the two electrical connectors are respectively located at two opposite sides of the same surface of the circuit board, the battery and the shift switch of the first brake lever assembly are electrically connected to one of the two electrical connectors, and the shift switch of the second brake lever assembly is electrically connected to the other one of the two electrical connectors.

4. The bicycle head according to claim 2, further comprising a second brake lever assembly mounted on the handlebar, wherein the second brake lever assembly comprises a main body, a brake assembly, and a shift switch, the brake assembly of the second brake lever assembly is disposed on the main body of the second brake lever assembly, the shift switch of the second brake lever assembly is disposed on the brake assembly of the second brake lever assembly, the at least one electrical connector comprises two electrical connectors, the two electrical connectors are respectively located at two opposite surfaces of the circuit board and located at the same end of the circuit board, the battery and the shift switch of the first brake lever assembly are electrically connected to one of the two electrical connectors, and the shift switch of the second brake lever assembly is electrically connected to the other one of the two electrical connectors.

5. The bicycle head according to claim 2, further comprising a second brake lever assembly mounted on the handlebar, wherein the second brake lever assembly comprises a main body, a brake assembly, and a shift switch, the brake assembly of the second brake lever assembly is disposed on the main body of the second brake lever assembly, the shift switch of the second brake lever assembly is disposed on the brake assembly of the second brake lever assembly, the at least one electrical connector comprises three electrical connectors, two of the three electrical connectors are respectively located two opposite sides of the same surface of the circuit board, two of the three electrical connectors are respectively located at two opposite surfaces of the circuit board and located at the same end of the circuit board, the battery and the shift switch of the first brake lever assembly are electrically connected to one of the three electrical connectors, and the shift switch is electrically connected to one of the other two of the three electrical connectors.

6. The bicycle head according to claim 1, wherein the shift control box comprises two electrical connectors, the two electrical connectors are disposed on the circuit board, each of the two electrical connectors comprises at least one power port and at least one signal port spaced apart from each other, the battery and the shift switch are electrically connected to the at least one power port and the at least one signal port of one of the two electrical connectors.

7. The bicycle head according to claim 1, further comprising a cable, wherein the shift control box comprises at least one electrical connector, and at least one extension component, the at least one electrical connector is disposed on the circuit board, the at least one extension component is electrically connected to the at least one electrical connector, and the battery and the shift switch are electrically connected to the at least one extension component via the cable.

8. The bicycle head according to claim 1, wherein the brake assembly of the first brake lever assembly comprises a tank, a lever, a piston, and a link, the tank and a part of the lever are located in the main body, the shift switch is disposed on the lever, the piston is movably located in the tank, two opposite ends of the link are respectively connected to the piston and the lever, the tank has an oil outlet, and the piston is located between the link and the oil outlet.

9. The bicycle head according to claim 1, wherein the brake assembly of the first brake lever assembly comprises a tank, a lever, a piston, and a link, the tank and a part of the lever are located in the main body, the shift switch is disposed on the lever, the piston is movably located in the tank, two opposite ends of the link are respectively connected to the piston and the lever, the tank has an oil outlet, and the oil outlet and the link are located at the same side of the piston.

10. The bicycle head according to claim 1, further comprising a mount component, wherein the mount component comprises a sleeve portion and an accommodation portion, the accommodation portion is pivotably disposed on the sleeve portion, the sleeve portion is sleeved on the vertical tube, and the shift control box is mounted on the accommodation portion.

11. The bicycle head according to claim 10, wherein the accommodation portion has an insertion space and two guide ribs, the two guide ribs are located in the insertion space and opposite to each other, the shift control box has two guide grooves opposite to each other, and the two guide ribs are mounted into the two guide grooves.

12. A bicycle shift control box, comprising:
a casing;
a circuit board, disposed in the casing, wherein the circuit board has a control unit, a motion sensing unit, and a wireless transmission unit; and
at least one electrical connector, disposed on the circuit board, wherein the at least one electrical connector and one of the control unit, the motion sensing unit, and the wireless transmission unit are respectively located at two opposite surfaces of the circuit board;
wherein the bicycle shift control box further comprises a light-emitting component, a light guide, a control switch, and a button, the casing has a first opening and a second opening spaced apart from each other, the light-emitting component and the control switch are disposed on the circuit board and are respectively aligned with the first opening and the second opening, and the light guide and the button are respectively disposed at the first opening and the second opening.

13. The bicycle shift control box according to claim 12, wherein the at least one electrical connector comprises two electrical connectors, and the two electrical connectors are respectively located at two opposite sides of the same surface of the circuit board.

14. The bicycle shift control box according to claim 12, wherein the at least one electrical connector comprises two electrical connectors, the two electrical connectors are respectively located at two opposite surfaces of the circuit board and located at the same end of the circuit board.

15. The bicycle shift control box according to claim 12, wherein the at least one electrical connector comprises three electrical connectors, two of the three electrical connectors are respectively located at two opposite sides of the same surface of the circuit board, and two of the three electrical connectors are respectively located at two opposite surface of the circuit board and located at the same end of the circuit board.

16. The bicycle shift control box according to claim 12, wherein the at least one electrical connector comprises at least one power port and at least one signal port spaced apart from each other.

17. A bicycle shift control box, comprising:
a casing;
a circuit board, disposed in the casing; and
two electrical connectors, disposed on the circuit board, wherein each of the two electrical connectors comprises at least one power port and at least one signal port spaced apart from each other;
wherein the bicycle shift control box further comprises a light-emitting component, a light guide, a control switch, and a button, the casing has a first opening and a second opening spaced apart from each other, the light-emitting component and the control switch are disposed on the circuit board and are respectively aligned with the first opening and the second opening, and the light guide and the button are respectively disposed at the first opening and the second opening.

18. A bicycle head, configured to be mounted on a bicycle frame, comprising:
a vertical tube;
a stem, wherein one end of the stem is mounted on the vertical tube;
a handlebar, fixed to another end of the stem;
a first brake lever assembly, mounted on the handlebar, wherein the first brake lever assembly comprises a main body, a brake assembly, a shift switch, and a battery, the brake assembly and the battery are disposed on the main body, and the shift switch is disposed on the brake assembly; and
a shift control box, disposed on one of the vertical tube, the stem, and the handlebar and electrically connected to the battery and the shift switch;
wherein the shift control box comprises a casing, a circuit board, and at least one electrical connector, the circuit board is disposed in the casing, the circuit board has a control unit, a motion sensing unit, and a wireless transmission unit, the at least one electrical connector is disposed on the circuit board, the at least one electrical connector and one of the control unit, the motion sensing unit, and the wireless transmission unit are respectively located two opposite surfaces of the circuit board, and the battery and the shift switch are electrically connected to the at least one electrical connector.

* * * * *